(12) United States Patent
Guo et al.

(10) Patent No.: US 10,447,799 B2
(45) Date of Patent: Oct. 15, 2019

(54) METHOD AND APPARATUS FOR PROVIDING COMPUTING RESOURCES

(71) Applicant: EMC Corporation, Hopkinton, MA (US)

(72) Inventors: Feng Guo, Shanghai (CN); Qiyan Chen, Shanghai (CN); Qianjie Zhong, Shanghi (CN); Chao Chen, Shanghai (CN); Bo Chen, Shanghai (CN); Ziye Yang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 14/141,107

(22) Filed: Dec. 26, 2013

(65) Prior Publication Data

US 2014/0189419 A1 Jul. 3, 2014

(30) Foreign Application Priority Data

Dec. 27, 2012 (CN) .......................... 2012 1 0595674

(51) Int. Cl.
  *H04L 29/08* (2006.01)
  *G06F 11/07* (2006.01)
  *H04L 29/06* (2006.01)
  *G06F 9/50* (2006.01)
  *G06F 16/9535* (2019.01)
  *H04L 12/26* (2006.01)
  *H04L 12/24* (2006.01)
  (Continued)

(52) U.S. Cl.
  CPC ........ *H04L 67/2838* (2013.01); *G06F 9/5027* (2013.01); *G06F 11/0709* (2013.01); *G06F 16/9535* (2019.01); *H04L 67/306* (2013.01); *H04L 67/34* (2013.01); *H04L 67/38* (2013.01); *G06F 11/1484* (2013.01); *G06F 11/301* (2013.01); *G06F 11/3055* (2013.01); *H04L 41/0654* (2013.01); *H04L 41/5096* (2013.01); *H04L 43/0817* (2013.01)

(58) Field of Classification Search
  CPC .............. G06F 9/5027; G06F 11/0709; G06F 11/1484; G06F 11/301; G06F 16/9535; H04L 67/2838; H04L 67/306; H04L 67/34; H04L 67/38
  USPC ................................ 709/224, 226, 223, 204
  See application file for complete search history.

(56) References Cited

U.S. PATENT DOCUMENTS

8,978,122 B1  3/2015 Zolfonoon et al.
9,055,067 B1 * 6/2015 Ward, Jr. ................ H04L 67/10
(Continued)

*Primary Examiner* — Chirag R Patel
*Assistant Examiner* — Marshall M McLeod
(74) *Attorney, Agent, or Firm* — BainwoodHuang (57) ABSTRACT

Embodiments of the present invention relate to a method and apparatus for providing computing resources to a user. In one embodiment of the present invention, there is provided a method for providing computing resources to a user, comprising: in response to a request from the user, looking up in a profile repository a profile corresponding to the user's domain information; requesting at least one computing resource associated with the profile; integrating the at least one computing resource into a virtual datacenter; and providing the virtual datacenter to the user; wherein the at least one computing resource is physically deployed in a distributed manner. In one embodiment of the present invention, there is provided an apparatus for providing computing resources to a user.

24 Claims, 7 Drawing Sheets

(51) Int. Cl.
*G06F 11/14* (2006.01)
*G06F 11/30* (2006.01)

(56) References Cited

U.S. PATENT DOCUMENTS

| | | |
|---|---|---|
| 9,307,015 B1 | 4/2016 | Bauer et al. |
| 9,781,102 B1 | 10/2017 | Knjazihhin et al. |
| 10,148,505 B2 | 12/2018 | Kozlovsky |
| 10,148,611 B2 | 12/2018 | Stotski et al. |
| 2007/0067435 A1* | 3/2007 | Landis ............... G06F 9/5016 709/224 |
| 2011/0138050 A1* | 6/2011 | Dawson ............... G06F 9/5072 709/226 |
| 2011/0231550 A1* | 9/2011 | Murray ............... G06F 9/5011 709/226 |

* cited by examiner

Fig. 7

METHOD AND APPARATUS FOR PROVIDING COMPUTING RESOURCES

FIELD

Embodiments of the present invention relate to resource allocation, and more specifically, to a method and apparatus for providing computing resources to a user.

BACKGROUND

The development of the Internet technology brings about convenience to human work and life, and meanwhile, the concept of providing various services based on the Internet becomes popular with the increasing improvement of the Internet transmission efficiency. For example, so far there has been proposed the concept of Infrastructure as a Service (IaaS), i.e., a service that ordinary users (e.g., including individuals or companies or other entities) can obtain via the Internet computer infrastructure meeting their own demands. In addition, there have been further proposed the concept of Platform as a Service (PaaS) and the concept of Software as a Service (SaaS), so users can obtain via the Internet services from professional platform providers or software providers.

These service providers can customize and provide services according to users' specific demands, so that users can obtain various professional services (e.g., including infrastructure, platform and software) via the Internet. However, ordinary users (e.g., hospitals, shops, etc.) desiring to construct IT infrastructure (e.g., a datacenter) might lack expertise in hardware configuration and other aspect. As a result, although there are various service providers on the Internet, these ordinary users might not be aware of their own demands for hardware and software, let alone learn which service provider or providers are applied to for what kinds of computing resources while constructing IT infrastructure.

As restricted by their own knowledge, users have to turn to professional technicians for help while constructing IT infrastructure. On the one hand, this brings about to users huge overheads of manpower, material resources and time; on the other hand, professional technicians need to customize a solution for each user, and the reusability of these solutions is rather bad. Therefore, it has become a focus of attention as to how to provide appropriate IT infrastructure to a user where the user's demand is not quite clear.

SUMMARY

Therefore, it is desired to develop a solution capable of automatically providing customized IT infrastructure to a user, and it is desired that the technical solution can provide to the user IT infrastructure formed by various computing resources simply by requiring the user to provide simple information (e.g., providing industrial information on the user's domain and the user's scale information); further, it is desired that the user does not have to care about the physical positions or providers of these computing resources.

In one embodiment of the present invention, there is provided a method for providing computing resources to a user, comprising: in response to a request from the user, looking up in a profile repository a profile corresponding to the user's domain information; requesting at least one computing resource associated with the profile; integrating the at least one computing resource into a virtual datacenter; and providing the virtual datacenter to the user; wherein the at least one computing resource is physically deployed in a distributed manner.

In one embodiment of the present invention, the requesting at least one computing resource associated with the profile comprises: with respect to one computing resource of the at least one computing resource, parsing logical description of the computing resource; and in response to in a resource pool there existing an available resource corresponding to the logical description, providing the available resource as the computing resource.

In one embodiment of the present invention, there is further comprised: in response to in a resource pool there existing no available resource corresponding to the logical description, mapping the logical description to one of at least one resource provider; and requesting the computing resource from the one of the at least one resource provider.

In one embodiment of the present invention, there is provided an apparatus for providing computer resources to a user, comprising: a lookup module configured to in response to a request from the user, look up in a profile repository a profile corresponding to the user's information; a requesting module configured to request at least one computing resource associated with the profile; an integrating module configured to integrate the at least one computing resource into a virtual datacenter; and a providing module configured to provide the virtual datacenter to the user; wherein the at least one computing resource is physically deployed in a distributed manner.

In one embodiment of the present invention, the requesting module comprises: a parsing module configured to with respect to one computing resource of the at least one computing resource, parse logical description of the computing resource; and an internal providing module configured to in response to in a resource pool there existing an available resource corresponding to the logical description, provide the available resource as the computing resource.

In one embodiment of the present invention, there is further comprised: a mapping module configured to in response to in a resource pool there existing no available resource corresponding to the logical description, map the logical description to one of at least one resource provider; and an external providing module configured to request the computing resource from the one of the at least one resource provider.

By means of the technical solution described in the present invention, various computing resources can be automatically requested from corresponding service providers according to a user's domain information and scale information, and the user does not have to care about the sources and physical positions of various computing resources or how these computing resources are organized together. The technical solution described in the present invention can integrate various computing resources provided on the Internet, and even a user without any professional experience can enjoy various services provided via the Internet. Therefore, the utilization efficiency of various services provided based on the Internet can be improved, whereas the requirement on users' professional experience can be lowered.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The technical solution according to the present invention can be implemented in a cloud environment. Specifically, cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or minimal interaction with a provider of the service. Hereinafter, terms involved in various embodiments of the present invention are explained first.

Infrastructure as a Service (IaaS): the capability of providing to a consumer processing, storage, network, and other basic computing resources where the consumer is able to deploy and run arbitrary software, wherein the software can include operating systems and applications. The consumer does not manage or control the underlying cloud infrastructure but has control over operating systems, storage, deployed applications, and possibly limited control of selected networking components (e.g., host firewalls).

Platform as a Service (PaaS): the capability, as provided to the consumer, of deploying consumer-created or acquired applications onto the cloud infrastructure. Such applications are created using programming languages and tools supported by the provider. The consumer does not manage or control the underlying cloud infrastructure including networks, servers, operating systems, or storage, but has control over the deployed applications and possibly application hosting environment configurations.

Software as a Service (SaaS): the capability, as provided to the consumer, of using the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Figure 1:
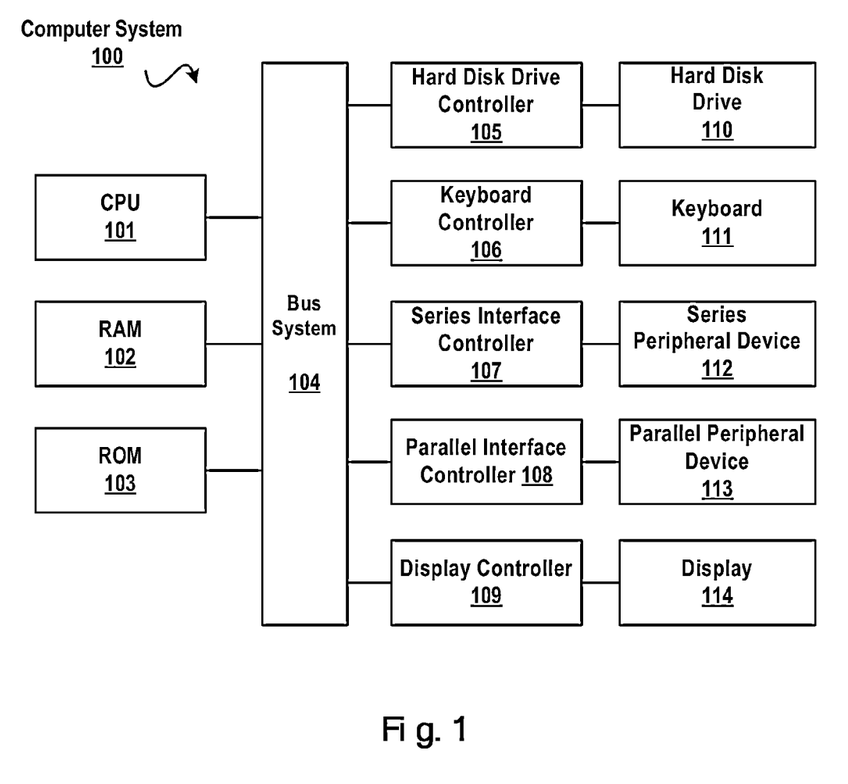
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
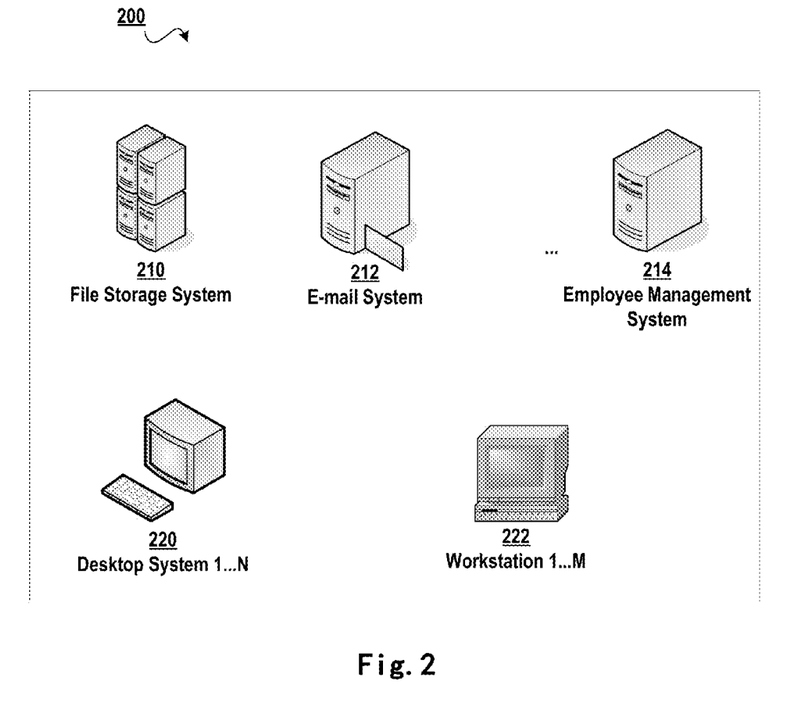
FIG. 2 schematically illustrates a schematic view of the architecture of a datacenter according to one solution.

FIG. 2 schematically illustrates a schematic view 200 of the architecture of a datacenter according to one solution. As illustrated in FIG. 2, a traditional datacenter is usually located at the same physical place where a user is located (e.g., a hospital). For example, a file storage system 210, a main system 212, . . . , and an employee management system 214 are usually in the hospital, and staff of the hospital can access these systems via workstations 1 . . . M 222 and desktop systems 1 . . . N 220 which are also located within the hospital scope. Various devices that are physically located within the hospital scope jointly form a datacenter of the hospital. To build such a datacenter, it is necessary to purchase hardware devices and software products, and to have the datacenter operate normally, it is further necessary to configure hardware devices, install software products and the like.

Figure 3:
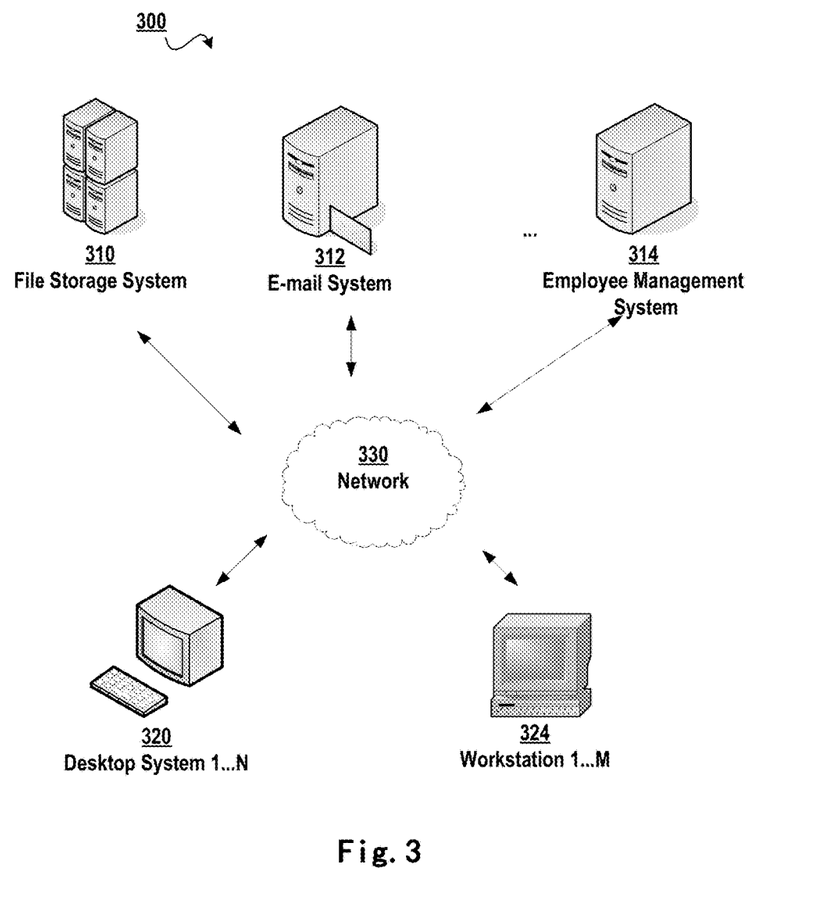
FIG. 3 schematically illustrates a schematic view of the architecture of a virtual datacenter according to the principles of the present invention.

FIG. 3 schematically illustrates a schematic view 300 of the architecture of a virtual datacenter according to principles of the present invention. Based on the principles of the present invention, a user datacenter is not necessarily physically located in the vicinity of the user. Instead, the datacenter can be formed by various computing resources that are accessible via the Internet, i.e., formed by some computing nodes in a cloud environment. Specifically, a file storage system 310, an e-mail system 312, . . . , an employee management system 314, virtual desktop systems 1 . . . N 320 and virtual workstations 1 . . . M 322 can be physically located at any place that is accessible via a network 330. Staff of the hospital can access and use these systems via the Internet.

The above merely depicts a user's demand (such as a hospital) on building a datacenter. Note users in the same domain usually have similar demands for configuring a datacenter. For example, the IT infrastructure of a medical organization usually includes a medical case management system, object storage and other resources; the IT infrastructure of a software development entity usually includes resources such as a code version control system, a project management system and the like. Therefore, it becomes a hot issue regarding how to automatically provide a user with a configuration scheme of IT infrastructure based on the user's domain. In this manner, it is possible to provide a user with proposals concerning IT infrastructure configuration and further to achieve the IT infrastructure, in the case that the user's demand is not quite clear.

In one embodiment of the present invention, there is provided a method for providing computing resources to a user, comprising: in response to a request from the user, looking up in a profile repository a profile corresponding to the user's domain information; requesting at least one computing resource associated with the profile; integrating the at least one computing resource into a virtual datacenter; and providing the virtual datacenter to the user; wherein the at least one computing resource is physically deployed in a distributed manner.

Figure 4:
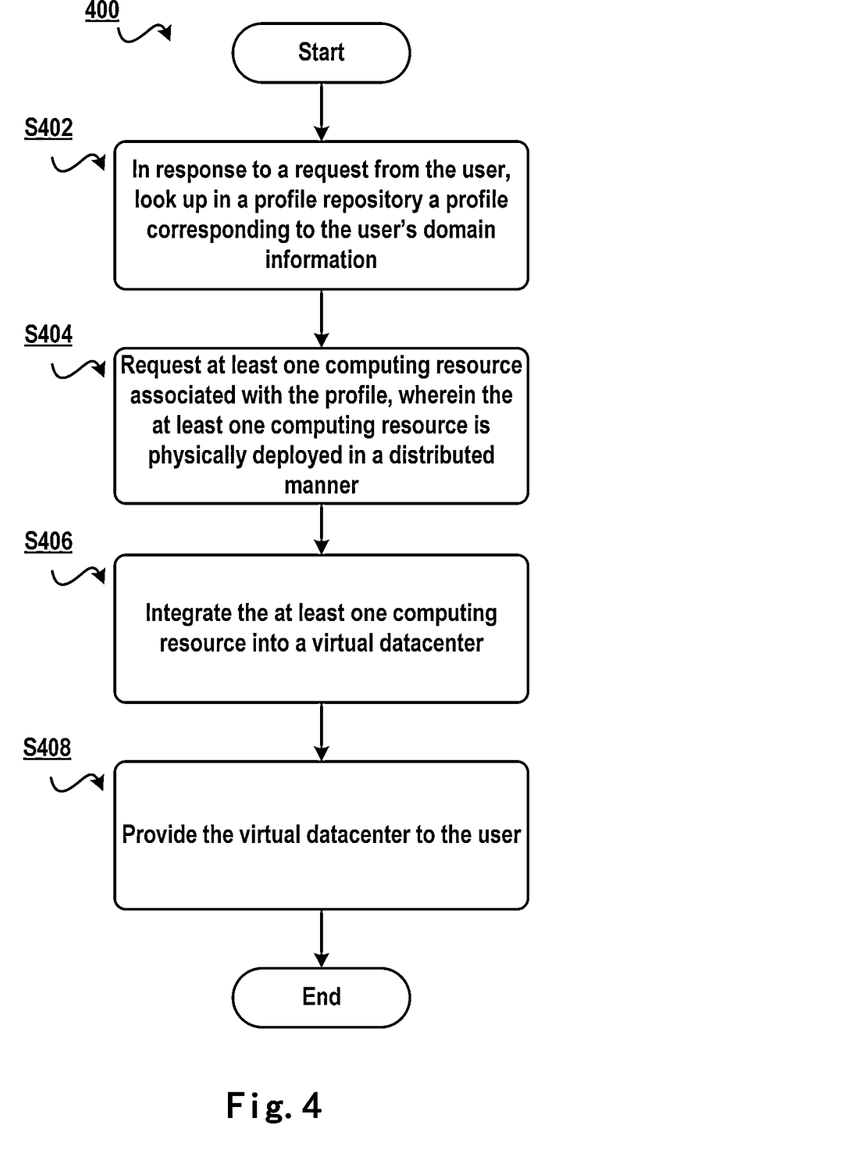
FIG. 4 schematically illustrates a flowchart of a method for providing computing resources to a user according to one embodiment of the present invention.

FIG. 4 schematically illustrates a flowchart 400 of a method for providing computing resources to a user according to one embodiment of the present invention. Specifically, in step S402, in response to a request from the user, a profile corresponding to the user's domain information is looked up in a profile repository. In one embodiment of the present invention, configurations of computing resources that are applicable to datacenters of users in various domains can be stored in the profile repository. Specifically, configurations of computing resources for a hospital and a software development entity are schematically illustrated in Table 1 below.

TABLE 1

Configurations of Computing Resources

| domain | scale | configurations of computing resources |
|---|---|---|
| hospital | n | virtual desktop (1 G CPU/512M Memory/20 G Storage/Single Network Interface Card) n*120% <br> virtual workstation (4 G CPU/2 G Memory/50 G Memory/Dual Network Interface Card) n*15% <br> shared virtual block storage (n*10 G) <br> object storage (n*40 G) <br> medical case management system <br> employee management system <br> financial reimbursement system <br> e-mail service system |
| software development | n | virtual desktop (2 G CPU/1 G Memory/40 G Storage/Single Network Interface Card) n*150% <br> virtual workstation (4 G CPU/2 G Memory/100 G Storage/Dual Network Interface Card) n*20% <br> shared virtual block storage (n*20 G) <br> shared file storage (n*20 G) <br> code version control system <br> document sharing and publishing system <br> project management system <br> Bug management system <br> FTP system <br> application deployment platform <br> employee management system <br> financial reimbursement system <br> e-mail service system |

According to one embodiment of the present invention, since users in the same domain have similar demands for computing resources of datacenters, a user simply needs to input the domain to which he/she belongs, desired resource configurations can be recommended to the user according to a predefined profile. Specifically, when a user inputs "hospital," a profile corresponding to "hospital" can be looked up in the profile repository as illustrated in Table 1.

In step S404, at least one computing resource associated with the profile is requested, wherein the at least one computing resource is physically deployed in a distributed manner. After obtaining a profile corresponding to the user's domain, computing resources associated with the profile are requested. Note the amount and type of computing resources are not limited in the context of the present invention. For example, the computing resources can be those that are accessible via the Internet, including, without limitation, infrastructures, platforms, software, etc. Further note the context of the present invention does not limit which provider or providers provide(s) these computing resources. The computing resources provided to one user can be resources provided by the same or different providers, and physical positions of these providers are transparent to customers, so long as the user can access these resources via the Internet.

In the above example where the user is a hospital, the following hardware resources can be requested from the infrastructure provider: virtual desktop (1G CPU/512M Memory/20G Storage/Single Network Interface Card); virtual workstation (4G CPU/2G Memory/50G Storage/Dual Network Interface Card); shared virtual block storage (n*10G); and object storage (n*40G). Further the following platform and/or software resources can be requested from the platform and/or software provider: medical case management system, employee management system, financial reimbursement system, and e-mail service system.

In step S406, the at least one computing resource is integrated into a virtual datacenter. Note in order to provide the user with a virtual datacenter that is logically accessible, it is necessary to integrate various requested computing resources, rather than providing the user with scattered computing resources. For example, it may be checked whether various computing resources defined in profiles have been requested, and an interface may be provided to the user for supporting the user to query information in the virtual datacenter and the status of computing resources included in the virtual datacenter. For another example, the user may be billed based on the kind, amount and other factor of computing resources provided to the user.

Finally in step S408, the virtual datacenter is provided to the user. The datacenter here is a virtual datacenter that is logically accessible by the user. The user does not have to care about the physical position of various computing resources in the datacenter but can achieve access via the Internet. With the technical solution of the virtual datacenter, the user does not have to build a special computer room for various devices of the datacenter or purchase various hardware devices for usage as IT infrastructure of the datacenter, but the user simply needs to have the capability to access various hardware and software services via the high-speed Internet. Note the context of the present invention does not care about concrete details of IaaS, PaaS and SaaS providers and the high-speed Internet implementation, but only cares about how to use and integrate these services provided via the Internet.

Authentication, authorization and various techniques that are currently known or will be developed in future may be leveraged in order to ensure the security while the user is using the virtual datacenter.

In one embodiment of the present invention, the looking up in a profile repository a profile corresponding to the user's domain information further comprises: adjusting the profile based on the user's scale information. Since users' scales might differ widely, the amounts of needed computing resources may also differ significantly. For example, regarding the numbers of virtual desktops and virtual workstations, the requirement of a hospital with 100 staff may differ from that of a hospital with 200 staff. Therefore, the profile may be adjusted based on the user's scale information.

In addition, the user might further modify the amount and kind of computing resources in the profile based on his/her own demand. In one embodiment of the present invention, the looking up in a profile repository a profile corresponding to the user's domain information comprises: modifying the profile in response to an input from the user. Specifically, the profile as illustrated in Table 1 may be prompted to a user belonging to the "hospital" domain; where "e-mail service system" has been built, the user may cancel the "e-mail service system" option in the profile so as to avoid duplicated investment.

In one embodiment of the present invention, if in the profile repository there is no profile that completely matches the user's domain, then a domain that is closest to the user's domain is searched for in the profile repository, and a profile that describes optional computing resources is prompted to the user. For example, a basic profile (as illustrated in Table 2 below) that is suitable to ordinary enterprises may be preset in the profile repository. The user can add or delete some computing resources on the basis of the basic profile as demanded; in addition, recommendations for modifying the profile may be automatically provided to the user based on the user demand and an expert knowledge repository.

TABLE 2

Configurations of Computing Resources

| Domain | scale | configurations of computing resources |
|---|---|---|
| ordinary enterprise | n | virtual desktop (1 G CPU/512M Memory/20 G Storage/Single Network Interface Card) n*120% virtual workstation (4 G CPU/2 G Memory/50 G Storage/Dual Network Interface Card) n*15% shared virtual block storage (n*10 G) object storage (n*40 G) employee management system financial reimbursement system e-mail service system |

In one embodiment of the present invention, there is further comprised: updating the profile repository using the modified profile. After a profile that is suitable for the user's domain and scale is customized based on the user demand and an expert knowledge repository, the profile may be updated into the profile repository so as to serve as a basis for possible future queries.

Figure 5:
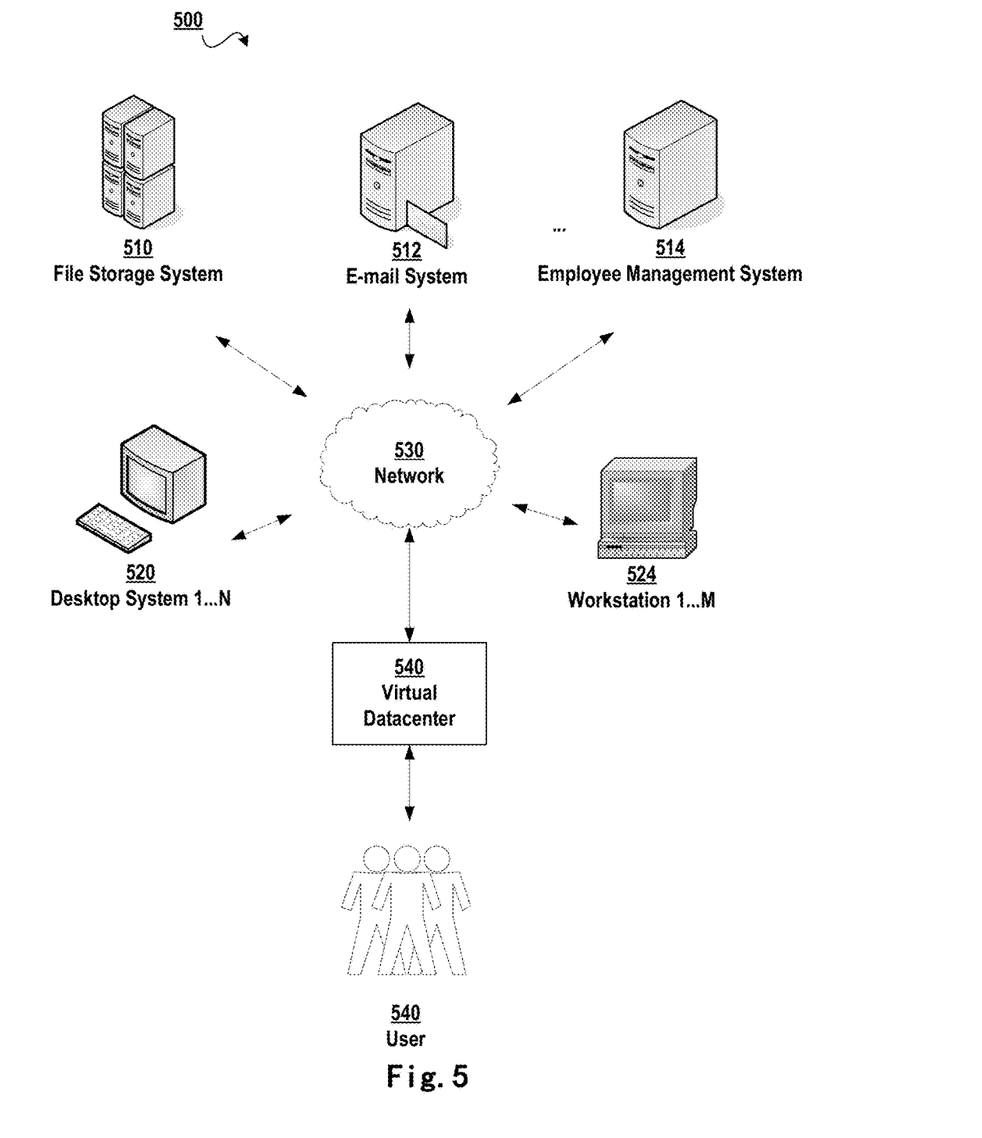
FIG. 5 schematically illustrates a schematic view of the architecture of a virtual datacenter according to one embodiment of the present invention.

FIG. 5 schematically illustrates a schematic view 500 of the architecture of a virtual datacenter according to one embodiment of the present invention. As illustrated in FIG. 5, a file memory system 510, an e-mail system 512, . . . , an employee management system 514, virtual desktop systems 1 . . . N 520 and virtual workstations 1 . . . M 522 may be located at any position that is accessible via the Internet, and may be provided by the same or different service providers. With the method described with reference to FIG. 4, these computing resources may be integrated into a virtual datacenter 540 and provided to users.

Specifically, different users can access virtual datacenters that are customized according to their own demands. Since computing resources in the virtual datacenter may come from the same or different service providers, huge extensibility is provided for providing a virtual datacenter by using the technical solution of the present invention. For example, when the user demand changes (for example, desiring to increase the number of virtual desktops), a request may be made to the same or different virtual desktop providers. For another example, when a user in the hospital domain wishes to build an FTP system, then a request is submitted to only a service provider providing an FTP system.

In one embodiment of the present invention, the requesting at least one computing resource associated with the profile comprises: with respect to one computing resource of the at least one computing resource, parsing logical description of the computing resource; and in response to in a resource pool there existing an available resource corresponding to the logical description, providing the available resource as the computing resource.

Logical description of a computing resource may define which computing resource is obtained from which service provider/providers. For example, logical description of a computing resource may be defined using the format as illustrated in Table 3 below.

TABLE 3

Logical Description

| No. | computing resource | logical description |
|---|---|---|
| 1 | virtual desktop | resource pool-VM; and/or Amazon Web service-VM |
| 2 | virtual workstation | Amazon Web service-VM |
| . . . | . . . | . . . |
| N | employee management system | Salesforce-employee management system |

In this embodiment a resource pool may be built. For example, computing resources may be requested in advance to resource providers (e.g., IaaS, PaaS and SaaS service providers) for later use, or after a specific user releases a computing resource of the virtual datacenter, the released resource is not immediately returned to the resource provider but is cached in the resource pool for later use. For example, in the logical description illustrated in Table 3, it is defined that a virtual desktop may be requested from a resource pool and/or Amazon Web service. Thus, it may be checked first whether or not an available resource corresponding to the logical description exists in the resource pool, and in response to a "Yes" result, the available resource is provided as the computing resource.

In one embodiment of the present invention, there is further comprised: in response to in a resource pool there existing no available resource corresponding to the logical description, mapping the logical description to one of at least one resource provider; and requesting the computing resource from the one of the at least one resource provider.

Continue the above example. When no virtual desktop exists in the resource pool or computing resources in the resource pool are not enough to meet the user demand, a request for resource allocation may be submitted to Amazon Web service. The requesting for resource allocation to a resource provider is similar to the requesting in the prior art, so various details are omitted here. An advantage of using the technical solution described in the present invention is that resource requesting and allocation are transparent to a user, and the user does not need to learn about the physical position of a computing resource being used or care about tedious operations involved while requesting and allocating resources.

In the foregoing description, the requesting and allocating computing resources have been illustrated by taking Amazon Web service and Salesforce as examples of resource providers. Those skilled in the art would appreciate that in the embodiments of the present invention, computing resource providers may include any providers of infrastructure, platform and software that can be obtained via the Internet.

In one embodiment of the present invention, there is further comprised: monitoring a running status of the at least one resource provider; and filtering the at least one resource provider based on the running status. To learn about the stability and other features of various resource providers, the running status of the resource provider may be monitored in real time, so that when requesting a computer resource later, a resource provider with relatively stable running status may be a priority if there are a plurality of alternative resource providers.

In one embodiment of the present invention, the providing the virtual datacenter to the user comprises: providing to the user at least one address associated with the at least one computing resource; and in response to the user accessing one of the addresses, invoking a computing resource associated with the address. For example, an address (e.g., may be in the form of URL) list as illustrated in Table 4 below may be provided to the user, and a username and password for accessing the address may be further provided so as to support the user to access a corresponding computing resource.

TABLE 4

Address List

| No. | computing resource | address | username | password |
|---|---|---|---|---|
| 1 | virtual desktop | www.***.com/desktop/ | Admin | ### |
| 2 | virtual workstation | www.***.com/workstation/ | Admin | ### |
| ... | ... | ... | | |
| N | employee management system | www.***.com/managesys/ | Admin | ### |

When the user desires to access various computing resources, he/she may input an address illustrated in Table 4 and invoke a c computing resource simply by using a corresponding username and password. For example, when the user desires to query information on an employee Alan in the employee management system, he/she may use a username "Admin" and password "###" to log into www.***.com/managesys/, thereby making a query in following pages.

In one embodiment of the present invention, the providing the virtual datacenter to the user comprises: forwarding the interaction between the user and the at least one computing resource. Note that the virtual datacenter provided according to the technical solution of the present invention is an interface between the user and the at least one resource provider that is accessible via the Internet, and the user can logically access various computing resources in the virtual datacenter without a need to learn about the real physical position of various computing resources. Therefore, the interaction between the user and the at least one computing resource may be forwarded, so as to support the user to interact with real computing resources that form the virtual center.

Figure 6:
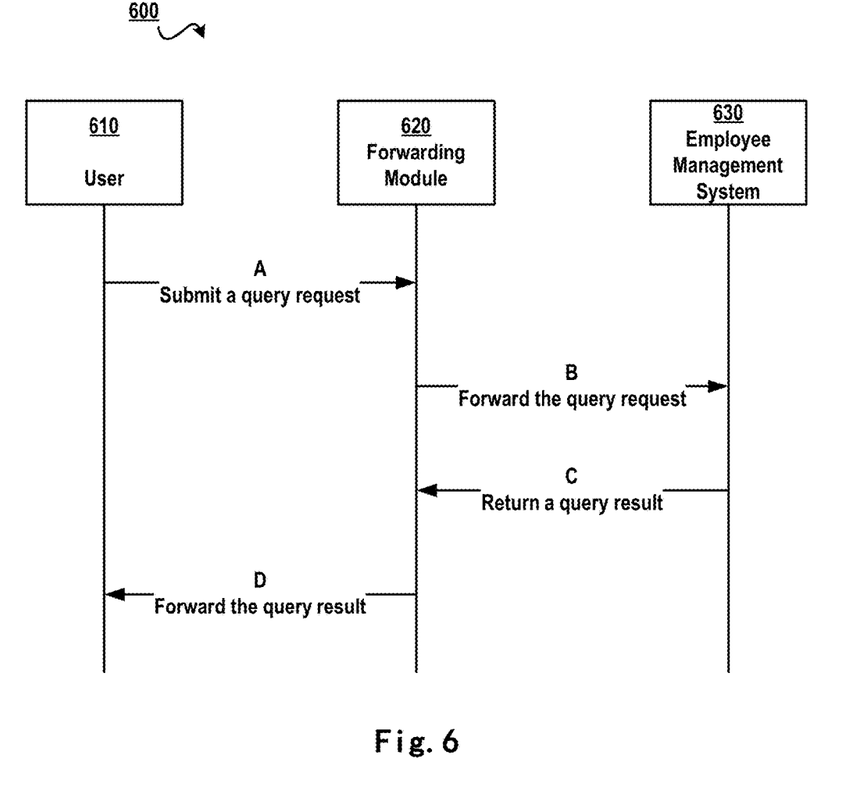
FIG. 6 schematically illustrates a block diagram of the interaction between a user and a virtual datacenter according to one embodiment of the present invention.

Specifically, FIG. 6 schematically illustrates a block diagram 60 of the interaction between the user and the virtual datacenter according to one embodiment of the present invention. For example, a forwarding module 620 may be disposed in the virtual datacenter for forwarding the interaction between the user and the at least one computing resource. For example, when a user (e.g., a software development company) wants to query the information of an employee Alan in an employee management system, a query request may be submitted from a user 610 to a forwarding module 620 (as illustrated by arrow A). In response to receipt of the query request, the forwarding module 620 immediately forwards the query quest to an employee management system 630 that is accessible via the Internet (as illustrated by arrow B). Next, employee management system 630 returns a query result to the forwarding module 620 (as illustrated by arrow C), and then the forwarding module 620 forwards the query result to the user 610 (as illustrated by arrow D). At this point, although the query request from the user 610 and the query result from an employee management system 630 are forwarded by the forwarding module 620, such forwarding procedure is transparent from the perspective of the user 610.

In one embodiment of the present invention, the providing the virtual datacenter to the user further comprises: monitoring a status of the at least one computing resource; and in response to a fault occurring in one of the at least one computing resource, repairing the computing resource.

Specifically, although the resource provider monitors in real time the running status of the computing resource provided by himself, to improve the reliability and stability of the virtual datacenter, further the running status of each computing resource in the virtual datacenter can be monitored in real time or periodically. For example, collecting the device information of hardware infrastructure (e.g., CPU workload, temperature, etc.), and collecting a response time and other parameters of a software computing resource so that when a specific computing resource breaks down, the resource provider can be notified in time and on the other hand, a remedy can be taken using other currently available computing resource. For example, when a VM corresponding to a certain virtual workstation stops the service, it is possible to try recovery from periodical mirroring of the VM.

In one embodiment of the present invention, the computing resources comprise any one of infrastructure, platform and software. With the technical solution described in the present invention, services of various IaaS, PaaS and SaaS providers as provided on the Internet currently can be integrated and provided to users in the form of a virtual datacenter. In this manner, the technical threshold that ordinary users request services to various service providers can be lowered, and on the other hand, the resource utilization efficiency of service providers can be improved greatly, and further overheads on manpower, material resources and time which ordinary users spend in building a datacenter can be reduced significantly.

Figure 7:
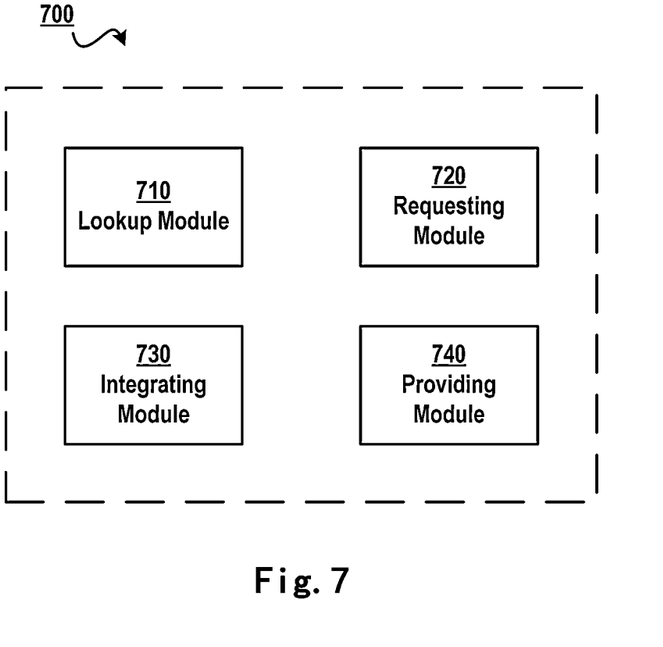
FIG. 7 schematically illustrates a block diagram of an apparatus for providing computing resources to a user according to one embodiment of the present invention.

FIG. 7 schematically illustrates a block diagram 700 of an apparatus for providing computing resources to a user. Specifically, there is provided an apparatus for providing computer resources to a user, comprising: a lookup module 710 configured to in response to a request from the user, lookup in a profile repository a profile corresponding to the user's domain information; a requesting module 720 configured to request at least one computing resource associated with the profile; an integrating module 730 configured to integrate the at least one computing resource into a virtual datacenter; and a providing module 740 configured to provide the virtual datacenter to the user; wherein the at least one computing resource is physically deployed in a distributed manner.

In one embodiment of the present invention, lookup module 710 comprises: an adjusting module configured to adjust the profile based on the user's scale information.

In one embodiment of the present invention, requesting module 720 comprises: a parsing module configured to with respect to one computing resource of the at least one computing resource, parse logical description of the computing resource; and an internal providing module configured to in response to in a resource pool there existing an available resource corresponding to the logical description, provide the available resource as the computing resource.

In one embodiment of the present invention, there is further comprised: a mapping module configured to in response to in a resource pool there existing no available resource corresponding to the logical description, map the logical description to one of at least one resource provider;

and an external providing module configured to request the computing resource from the one of the at least one resource provider.

In one embodiment of the present invention, there is further comprised: a monitoring module configured to monitor a running status of the at least one resource provider; and filtering module configured to filter the at least one resource provider based on the running status.

In one embodiment of the present invention, providing module 740 comprises: an address providing module configured to provide to the user at least one address associated with the at least one computing resource; and an invoking module configured to in response to the user accessing one of the addresses, invoke a computing resource associated with the address.

In one embodiment of the present invention, the providing module 740 further comprises: a resource monitoring module configured to monitor a status of the at least one computing resource; and a repairing module configured to in response to a fault occurring in one of the at least one computing resource, repair the computing resource.

In one embodiment of the present invention, the lookup module 710 further comprises: a modifying module configured to modify the profile in response to an input from the user.

In one embodiment of the present invention, there is further comprised: an updating module configured to update the profile repository using the modified profile.

In one embodiment of the present invention, the computing resources comprise any one of infrastructure, platform and software.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for providing computing resources to an entity, comprising:

in response to a request from the entity, looking up, in a profile repository, a profile corresponding to an industry type of the entity, wherein the profile defines a configuration of computing resources applicable to the industry type based on scale information related to a size of the entity;

wherein the configuration of computing resources includes virtual desktops and virtual workstations;

requesting computing resources defined within the profile;

integrating the requested computing resources into a virtual datacenter;

providing the virtual datacenter to the entity; and wherein the requested computing resources are physically deployed in a distributed manner from multiple service providers.

2. The method according to claim 1, wherein looking up in the profile repository of the profile corresponding to the industry type of the entity comprises:

scaling the configuration based on the entity's scale information.

3. The method according to claim 1, wherein requesting the computing resources defined within the profile comprises, with respect to one computing resource of the requested computing resources:

parsing a logical description of the computing resource; and in response to in a resource pool there existing an available resource corresponding to the logical description, providing the available resource as the one computing resource.

4. The method according to claim 3, wherein requesting the computing resources defined within the profile further comprises, with respect to another computing resource of the requested computing resources:

parsing another logical description of the other computing resource;

in response to in the resource pool there existing no available resource corresponding to the other logical description, mapping the other logical description to one of at least one resource provider; and requesting the computing resource from the one of the at least one resource provider.

5. The method according to claim 4, further comprising:

monitoring a running status of the at least one resource provider; and filtering the at least one resource provider based on the running status.

6. The method according to claim 1, wherein providing the virtual datacenter to the entity comprises:

providing to the entity addresses associated with the requested computing resources; and in response to the entity accessing one of the addresses, invoking a computing resource associated with the one of the addresses.

7. The method according to claim 6, wherein providing the virtual datacenter to the entity further comprises:

monitoring a status of the one of the computing resources; and in response to a fault occurring in the one of the computing resources, repairing that computing resource.

8. The method according to claim 1, wherein looking up in the profile repository of the profile corresponding to the industry type of the entity comprises:

modifying the profile in response to an input from the entity.

9. The method according to claim 8, further comprising: updating the profile repository using the modified profile.

10. The method according to claim 1, wherein the computing resources comprise any one of infrastructure, platform and software.

11. A system, comprising:
a data storage system enabled to provide cloud services for a virtual data center; and
computer-executable logic encoded in memory of one or more computers enabled to provide computing resources to an entity, wherein the computer-executable program logic is configured for the execution of:
in response to a request from the entity, looking up in a profile repository a profile corresponding to the an industry type of the entity, wherein the profile defines a configuration of computing resources applicable to the industry type based on scale information related to a size of the entity;
wherein the configuration of computing resources includes virtual desktops and virtual workstations;
requesting computing resources defined within the profile;
integrating the requested computing resources into a virtual datacenter;
providing the virtual datacenter to the entity; and
wherein the requested computing resources are physically deployed in a distributed manner from multiple service providers.

12. The system of claim 11, wherein looking up in the profile repository of the profile corresponding to the industry type of the entity comprises:
scaling the configuration based on the entity's scale information.

13. The system of claim 11, wherein requesting the computing resources defined within the profile comprises, with respect to one computing resource of the requested computing resources:
parsing logical description of the computing resource; and
in response to in a resource pool there existing an available resource corresponding to the logical description, providing the available resource as the one computing resource.

14. The system according to claim 13, wherein requesting the computing resources defined within the profile further comprises, with respect to another computing resource of the requested computing resources:
parsing another logical description of the other computing resource;
in response to in the resource pool there existing no available resource corresponding to the logical description, mapping the other logical description to one of at least one resource provider; and
requesting the computing resource from the one of the at least one resource provider.

15. The system of claim 14, wherein the computer-executable program logic is further configured for the execution of:
monitoring a running status of the at least one resource provider; and
filtering the at least one resource provider based on the running status.

16. The system of claim 11, wherein the providing the virtual datacenter to the entity comprises:
providing to the entity addresses associated with the requested computing resources; and
in response to the entity accessing one of the addresses, invoking a computing resource associated with the one of the addresses.

17. The system of claim 16, wherein providing the virtual datacenter to the entity further comprises:
monitoring a status of the one of the computing resources; and
in response to a fault occurring in the one of the at computing resources, repairing that computing resource.

18. The system of claim 11, wherein looking up in the profile repository of the profile corresponding to the industry type of the entity comprises:
modifying the profile in response to an input from the entity.

19. The system of claim 18, wherein the computer-executable program logic is further configured for the execution of: updating the profile repository using the modified profile.

20. The system of claim 11, wherein the computing resources comprise any one of infrastructure, platform and software.

21. The system of claim 11, wherein the industry type of the profile is one of:
medical; and
software development.

22. The system of claim 11, wherein the industry type of the profile is medical and the configuration of computing resources includes:
a medical case management system;
an employee management system;
a financial reimbursement system; and
an e-mail service system.

23. The system of claim 11, wherein the industry type of the profile is software development and the configuration of computing resources includes:
a code version control system;
a document sharing and publishing system;
a project management system;
a bug management system; and
an FTP system.

24. The system of claim 11, wherein the request from the entity includes the industry type specified therein.

* * * * *